United States Patent
Sutera et al.

(10) Patent No.: US 11,934,263 B2
(45) Date of Patent: Mar. 19, 2024

(54) PARITY PROTECTED MEMORY BLOCKS MERGED WITH ERROR CORRECTION CODE (ECC) PROTECTED BLOCKS IN A CODEWORD FOR INCREASED MEMORY UTILIZATION

(71) Applicant: Ampere Computing LLC, Santa Clara, CA (US)

(72) Inventors: Massimo Sutera, Sunnyvale, CA (US); Nagi Aboulenein, King City, OR (US); Sandeep Brahmadathan, Dublin, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/707,660

(22) Filed: Mar. 29, 2022

(65) Prior Publication Data
US 2023/0315565 A1    Oct. 5, 2023

(51) Int. Cl.
  *G06F 11/00*    (2006.01)
  *G06F 11/10*    (2006.01)

(52) U.S. Cl.
  CPC .................. *G06F 11/102* (2013.01)

(58) Field of Classification Search
  CPC .............. G06F 11/102; G06F 11/1076; G06F 11/1016; G06F 11/108; G06F 11/1044; G06F 11/00
  USPC ................. 714/752, 758, 766, 776
  See application file for complete search history.

(56) References Cited

U.S. PATENT DOCUMENTS

| | | | |
|---|---|---|---|
| 7,203,890 B1 * | 4/2007 | Normoyle | G11C 8/00 714/766 |
| 9,183,085 B1 * | 11/2015 | Northcott | G06F 11/1012 |
| 9,195,537 B2 * | 11/2015 | Sharon | G11C 16/10 |
| 10,944,429 B1 * | 3/2021 | Yang | H03M 13/13 |
| 2003/0066010 A1 * | 4/2003 | Acton | H03M 13/19 |
| 2008/0034270 A1 * | 2/2008 | Onishi | G06F 11/1048 714/E11.049 |
| 2009/0313526 A1 * | 12/2009 | Neuman | G06F 11/10 714/E11.032 |
| 2013/0024746 A1 * | 1/2013 | Sharon | G06F 11/1044 714/766 |
| 2013/0227374 A1 * | 8/2013 | Desireddi | G06F 11/1012 714/E11.032 |

(Continued)

*Primary Examiner* — Shelly A Chase
*Assistant Examiner* — Osman M Alshack
(74) *Attorney, Agent, or Firm* — Withrow & Terranova, PLLC

(57) ABSTRACT

A memory control circuit stores codewords in a memory module configured to limit errors to one wire of a memory interface. A codeword includes a first block with a first data portion and a second block with a second data portion. An error correction code symbol in the second block is used to locate and correct errors in the second block. Some bits of the first block are repurposed as metadata. The remaining bits are used as parity bits for detecting errors in the first block. The second block is merged with the first block before being stored to memory and demerged from the first block in a memory read operation. Demerging causes errors in the first block to create errors in a corresponding location in the second block. The location of errors found in the second block is used to locate and correct parity errors in the first block.

24 Claims, 10 Drawing Sheets

(56) References Cited

U.S. PATENT DOCUMENTS

| | | | |
|---|---|---|---|
| 2016/0162353 A1* | 6/2016 | Manohar | H03M 13/27 |
| | | | 714/760 |
| 2017/0075758 A1* | 3/2017 | Suzuki | G06F 11/1068 |
| 2017/0201273 A1* | 7/2017 | Bonke | G06F 11/1068 |
| 2018/0011762 A1* | 1/2018 | Klein | G06F 11/1072 |
| 2018/0091172 A1* | 3/2018 | Ilani | G06F 11/1068 |
| 2021/0013903 A1* | 1/2021 | Vanaparthy | H03M 13/1102 |

* cited by examiner

PARITY PROTECTED MEMORY BLOCKS MERGED WITH ERROR CORRECTION CODE (ECC) PROTECTED BLOCKS IN A CODEWORD FOR INCREASED MEMORY UTILIZATION

BACKGROUND

I. Field of the Disclosure

The technology of the disclosure relates generally to digital data storage and, more particularly, to efficient utilization of memory capacity with high reliability.

II. Background

Many electronic devices employ some type of processing circuit that is controlled by computer software. Software includes instructions executed by a processing circuit and data processed by the processing circuit according to the instructions. The instructions and data are stored as binary data in memory circuits for access by the processing circuit. Such memory circuits may be physically located in a same integrated circuit (IC) as a processor or in a separate memory package. Proper operation of the electronic device depends on having correct binary data. Therefore, it is important that the memory circuits maintain the integrity of stored binary data for access by the processor. However, faults can occur in a memory circuit, causing stored data to be corrupted for a variety of reasons. Transient memory faults can be caused by electronic noise or high-energy particles, and more persistent memory faults can occur in memory circuits as they degrade over time. To reduce the chance of an electronic device incurring an operational failure due to erroneous data caused by memory circuit malfunction, processors and/or memory circuits employ error protection schemes that can detect data errors and even correct some data errors. In this manner, even if a memory circuit has a data error (e.g., one or more binary bits are flipped or their value cannot be determined), these errors can be corrected, and the corrected data can be provided to a processing circuit, allowing the processing circuit to continue operating normally.

Error protection schemes for data stored in memory circuits employ additional data bits ("error protection data") whose values are generated based on the binary data to be protected ("protected data"). These additional data bits can be parity bits, error-correction code (ECC) bits, ECC symbols, or other forms of error protection data. Error protection circuits use logic functions to generate and store the error protection data in memory circuits. An error protection circuit may be implemented in a memory controller that accesses the memory circuits and/or in a memory module itself. The error protection data can be generated by the error protection circuit when the protected data is stored to the memory circuits. Thereafter, when the protected data is retrieved from the memory circuits, the error protection data is also retrieved and used to verify that the retrieved protected data is correct. For a given error protection scheme, a higher level of error protection for the protected data (e.g., detection and/or correction of more bits) requires more error protection data bits. However, because error protection data bits are stored in a memory circuit and are transferred between the memory circuit and the memory controller, additional circuits and wires for error protection in a memory system can increase the overall sizes of ICs and memory modules (memory circuit boards). There is a tradeoff between the level of error protection supported by a memory circuit and the quantities of circuitry and memory space necessary to implement such protection.

SUMMARY OF THE DISCLOSURE

Aspects disclosed in the detailed description include parity-protected memory blocks merged with error correction code (ECC) protected blocks in a codeword for increased memory utilization. Related methods of error protection in a codeword to increase memory utilization are also disclosed. A memory control circuit coupled to a memory module transfers codewords comprising data and error protection information over a memory interface in each memory access operation. The memory interface includes a plurality of wires over which bits of a codeword are transferred in parallel in each transfer of a sequence of transfers in a memory access operation. The memory module is configured to limit errors in a codeword during the memory access operation. Each codeword is organized as a first block and a second block. The first and second blocks include first and second data portions, respectively, and first and second supplemental portions. The second supplemental portion comprises an ECC symbol that can be used to protect against errors in the second data portion. One or more errors in bits of the second data portion received on the memory interface are detected and corrected using the ECC symbol. The first supplemental portion can include another ECC symbol to protect the first block, but, in exemplary aspects, utilization of the codeword may be increased by repurposing some of the bits of the first supplemental portion as metadata providing codeword information associated with the first data portion and the second data portion in the codeword. However, with bits of the first supplemental portion used for metadata, an insufficient number of bits remain in the first supplemental portion for providing the same level of protection of the first data portion as the ECC symbol of the second supplemental portion provides for the second data portion.

In this regard, in other exemplary aspects disclosed herein, the first supplemental portion includes, in addition to the metadata bits, parity bits employed to protect against errors in the first data portion of the codeword. For example, an error on a single wire of the memory interface used to transfer the first block can be detected using the parity bits in the supplemental portion. Parity bits alone cannot identify the wire that transferred the erroneous data bit(s) in the first data portion, and the error(s) cannot be corrected unless their location is identified. To compensate for the loss of error protection caused by repurposing bits of the first supplemental portion as metadata bits, the second block is merged with the first block to generate a merged second block before the codeword is stored in a memory chip on a memory circuit board (memory module) in a write access operation. After the codeword is received back into the memory control circuit from the memory module in a read access operation, the merged second block is demerged using the first block. A result of demerging the second block with the first block is that errors in any location in the first block generate errors in a corresponding location in the demerged second block. Using the ECC symbol, the errors in the second block are located, so the corresponding errors in the first block can also be located, and all errors can be corrected. In this manner, the parity error(s) in the first block can be located and corrected. In some examples, merging the second block of each codeword with the first block of the codeword in a write access operation comprises exclusive-ORing (XORing) the first block with the second block. Demerging the merged second block in a read access operation comprises XORing the merged second block of the codeword with the first block. Protecting the codeword by reconfiguring the supplemental portion and merging the second block with the first block as described above allows some of the bits of the first supplemental portion to be repurposed as metadata bits, which increases memory utilization without reducing data protection.

Exemplary aspects disclosed herein include a memory control circuit configured to receive a codeword comprising a first block comprising a first data portion, metadata bits comprising codeword information, and parity bits. The codeword also comprises a second block comprising a second data portion, a first ECC symbol, and a second ECC symbol. The memory control circuit is configured to determine whether the second block comprises one or more bit error(s) based on the first ECC symbol and the second ECC symbol and, in response to determining the second block comprises the one or more bit error(s), correct the bit error. The memory control circuit is configured to determine whether the first block comprises one or more parity error(s) based on the parity bits and, in response to determining the first block comprises the one or more parity errors, generate a request for corrective action.

In another exemplary aspect, a method of codeword processing in a memory access operation, the method comprising receiving a codeword comprising a first block, the first block comprising a first portion of data bits, metadata bits comprising codeword information, and parity bits. The codeword also comprises a second block comprising a second portion of data bits, a first ECC symbol, and a second ECC symbol. The method comprises determining whether the first block comprises one or more bit error(s) based on an ECC algorithm employing the first ECC symbol and the second ECC symbol and, in response to determining the first block comprises one or more bit error(s), correcting the one or more bit error(s) based on the ECC algorithm. The method also comprises determining whether the second block comprises one or more parity error(s) based on a parity check employing the parity bits and, in response to determining the second block comprises the one or more parity error(s), generating a request for a corrective action.

A computer-readable medium comprising instructions that, when executed by a processor, cause the processor to receive a codeword comprising a first block comprising a first data portion, metadata bits comprising codeword information, and parity bits. The codeword also comprises a second block comprising a second data portion, a first ECC symbol, and a second ECC symbol. The instructions also cause the processor to determine whether the second block comprises one or more bit error(s) based on the first ECC symbol and the second ECC symbol and, in response to determining the second block comprises the one or more bit error(s), correct the bit error(s). The instructions also cause the processor to determine whether the first block comprises one or more parity error(s) based on the parity bits and, in response to determining the first block comprises the one or more parity error(s), generate a parity error indication.

DETAILED DESCRIPTION

Figure 1:
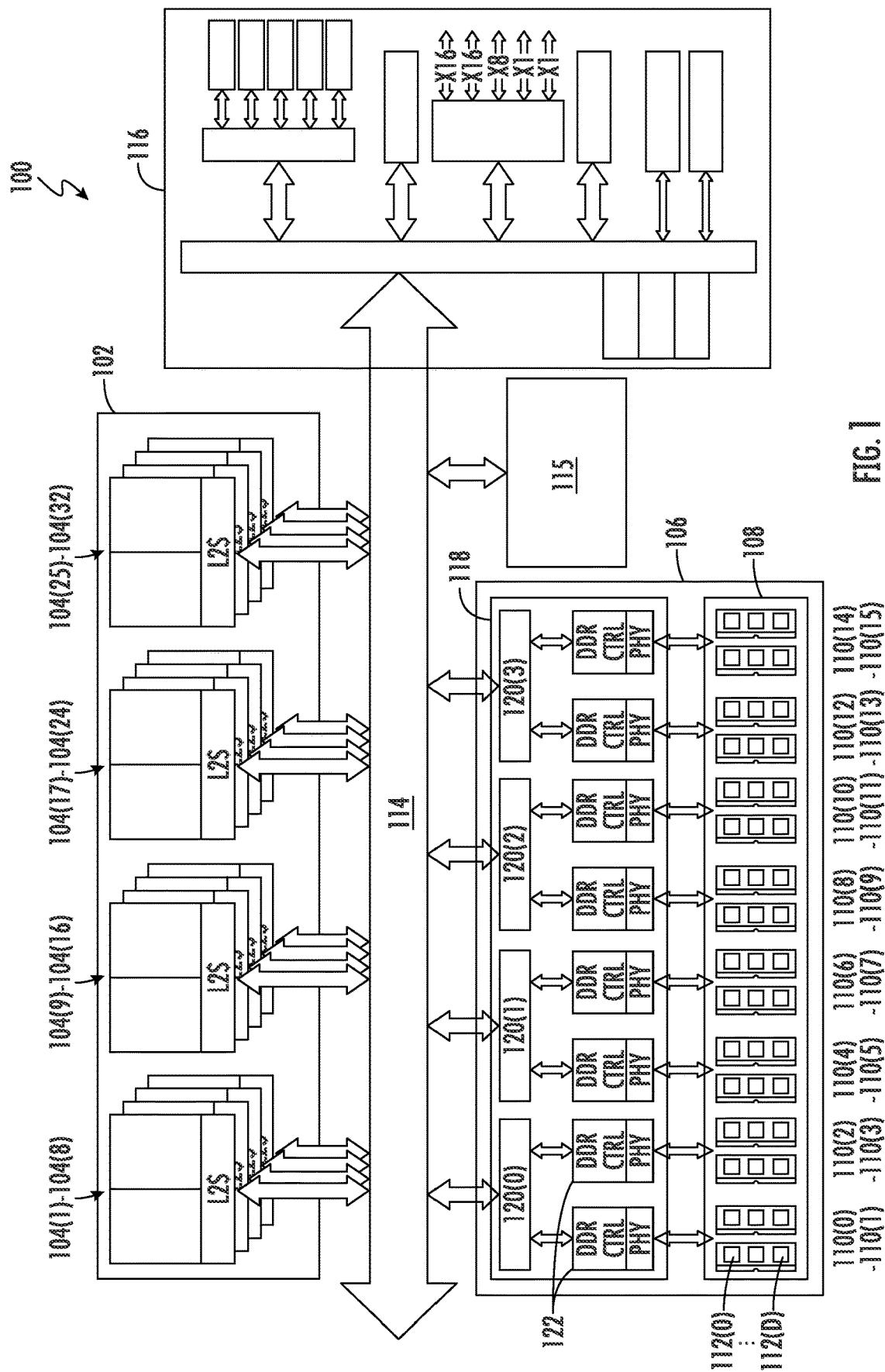
FIG. 1 is a block diagram of an exemplary computer system that includes a central processing unit (CPU) that includes a plurality of CPU cores and peripheral devices and other resources, including a memory system in which error correction codes (ECC) and parity are integrated in a memory control circuit to provide increased memory utilization.

With reference to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include parity-protected memory blocks merged with error correction code (ECC) protected blocks in a codeword for increased memory utilization. Related methods of error protection in a codeword to increase memory utilization are also disclosed. A memory control circuit coupled to a memory module transfers codewords comprising data and error protection information over a memory interface in each memory access operation. The memory interface includes a plurality of wires over which bits of a codeword are transferred in parallel in each transfer of a sequence of transfers in a memory access operation. The memory module is configured to limit errors in each transfer to a single bit of the interface during the memory access operation. Each codeword is organized as a first block and a second block. The first and second blocks include first and second data portions, respectively, and first and second supplemental portions. The second supplemental portion comprises an ECC symbol that can be used to protect against errors in the second data portion. One or more errors in bits of the second data portion received on the memory interface may be detected and corrected using the ECC symbol. The first supplemental portion can include another ECC symbol to protect the first block, but, in exemplary aspects, utilization of the codeword may be increased by repurposing some of the bits of the first supplemental portion as metadata providing codeword information associated with the first data portion and the second data portion in the codeword. However, with bits of the first supplemental portion used for metadata, an insufficient number of bits remain in the first supplemental portion for providing the same level of protection of the first data portion as the ECC symbol of the second supplemental portion provides for the second data portion.

In this regard, in other exemplary aspects disclosed herein, the first supplemental portion includes, in addition to the metadata bits, parity bits employed to protect against errors in the first data portion of the codeword. For example, an error on a single wire of the memory interface used to transfer the first block can be detected using the parity bits in the supplemental portion. Parity bits alone cannot identify the wire that transferred the erroneous data bit(s) in the first data portion, and the error(s) cannot be corrected unless their location is identified. To compensate for the loss of error protection caused by repurposing bits of the first supplemental portion as metadata bits, the second block is merged with the first block to generate a merged second block before the codeword is stored in a memory chip on a memory module in a write access operation. After the codeword is received back into the memory control circuit from the memory module in a read access operation, the merged second block is demerged using the first block. A result of demerging the second block with the first block is that errors in any location in the first block generate errors in a corresponding location in the demerged second block. Using the ECC symbol, the errors in the second block are located, so the corresponding errors in the first block can also be located, and all errors within the limit of errors allowed by the memory module can be corrected in the first block and the second block. In this manner, the parity error(s) in the first block can be located and corrected. In some examples, merging the second block of each codeword with the first block of the codeword in a write access operation comprises exclusive-ORing (XORing) the first block with the second block. Demerging the merged second block in a read access operation comprises XORing the merged second block of the codeword with the first block. Protecting the codeword by reconfiguring the supplemental portion and merging the second block with the first block as described above allows some of the bits of the first supplemental portion to be repurposed as metadata bits, which increases memory utilization without reducing data protection.

Figure 2:
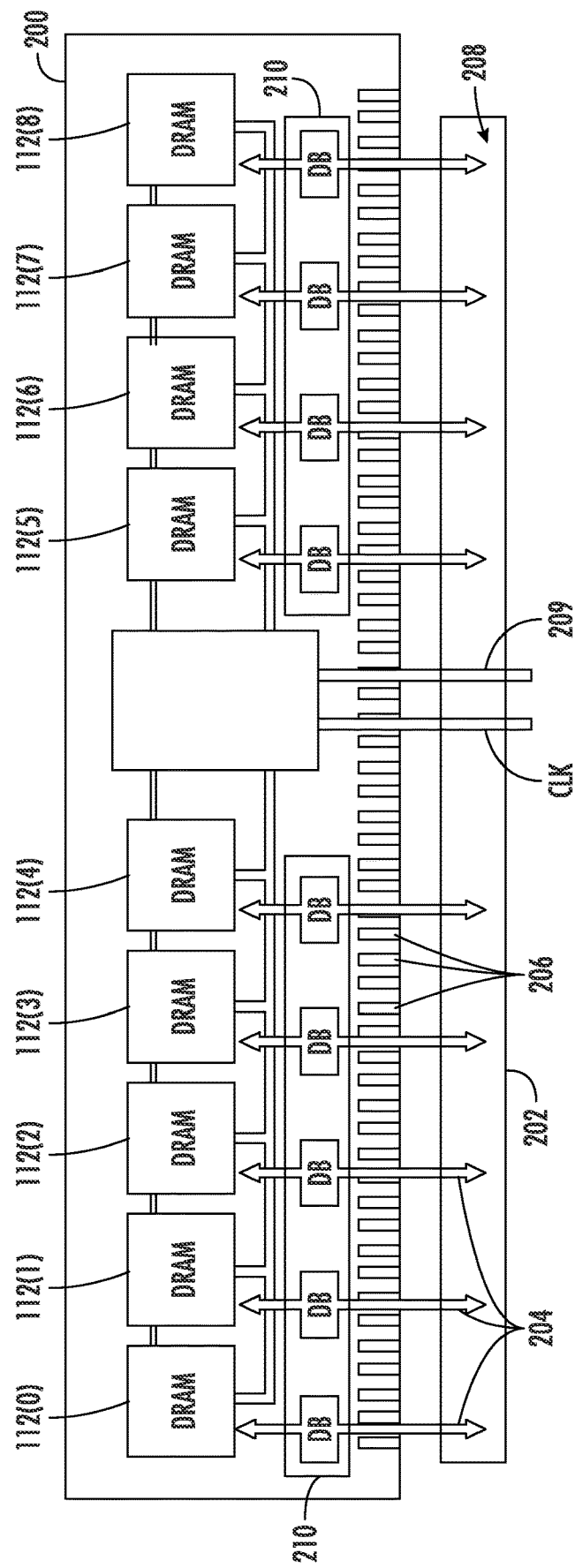
FIG. 2 is a block diagram of a memory module employed in the exemplary computer system in FIG. 1 and includes a plurality of memory chips controlled by the memory control circuit to perform memory access operations.
Figure 3:
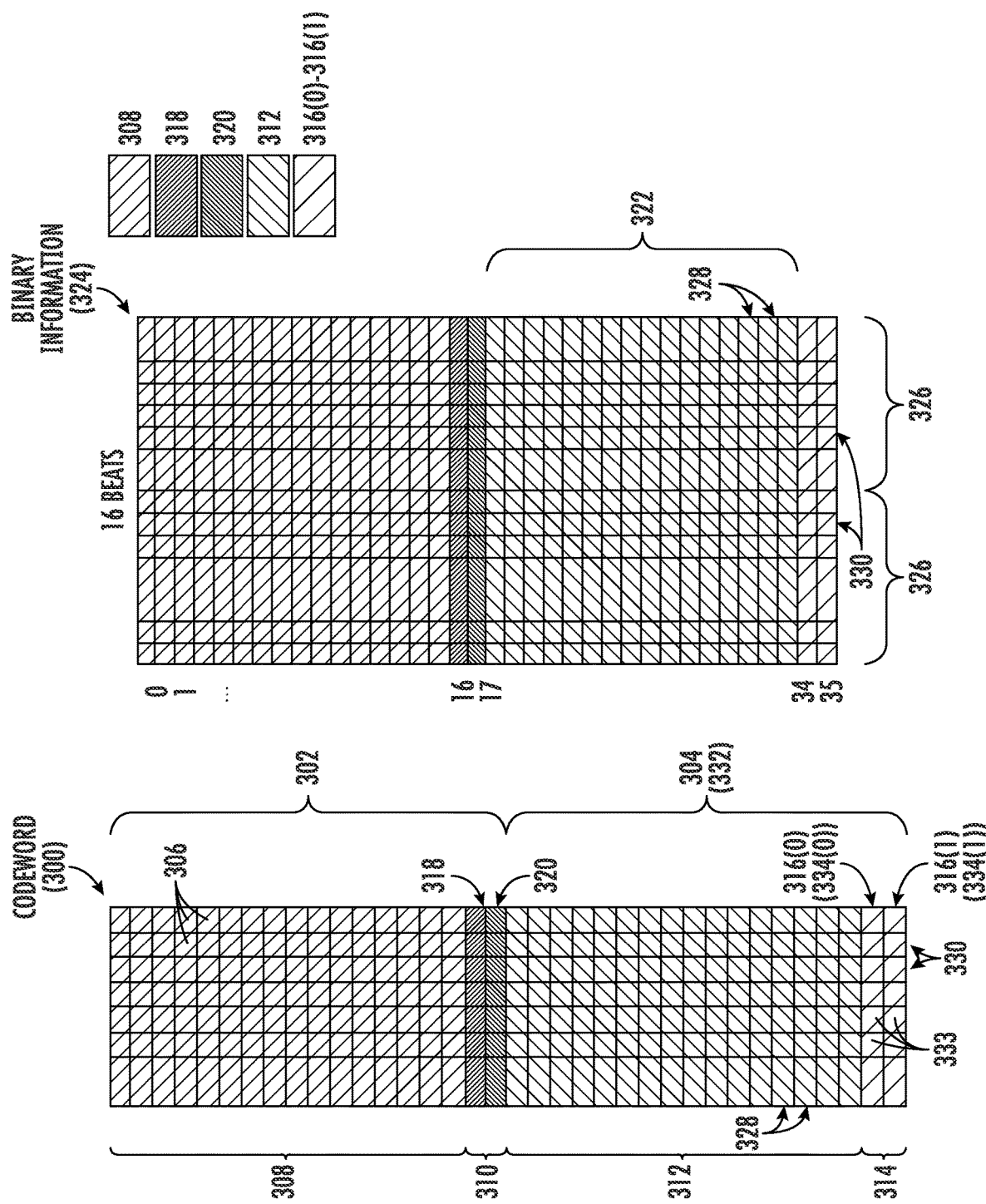
FIG. 3 illustrates binary information transferred between the memory control circuit and the memory module in a memory access operation and the structure of codewords included in the binary information.

Before discussing an exemplary memory control circuit employed to increase memory utilization while maintaining a high level of error protection with respect to FIG. 3, a description of FIG. 1 is provided to introduce a processor that may include the exemplary memory control circuit. FIG. 2 is provided to show a memory module with which the memory control circuit is configured to operate.

In this regard, FIG. 1 is a block diagram of an exemplary computer system 100 that includes a CPU 102 that includes a plurality of CPU cores 104(1)-104(C) and a memory system 106 for storing data to be accessed by the CPU cores 104(1)-104(C). For example, there may be thirty-two (32) CPU cores 104(1)-104(32) in the CPU 102 where 'C' is thirty-two (32). As discussed in more detail below, the memory system 106 integrates ECC and parity to increase memory utilization of the main memory 108 without reducing error protection in the memory system 106. For example, the main memory 108 may include a series of memory modules 110(0)-110(15) that each includes memory chips 112(0)-112(D) (e.g., DRAM memory chips). The memory modules 110(0)-110(15) comprise the memory chips 112(0)-112(D) on a circuit substrate such as a printed circuit board and may be referred to as memory modules 110(0)-110(M). For example, there may be sixteen memory modules 110(0)-110(15) in the main memory 108, wherein 'M' is sixteen (15), and each of the memory modules 110(0)-110(15) may include nine (9) memory chips, where 'D' is eight (8). The computer system 100 includes a cache memory hierarchy that stores data for quick access to the CPU cores 104(1)-104(C). Pairs of the CPU cores 104(1)-104(C) may each share a private level 2 cache memory L2S as part of the cache memory hierarchy. For example, in a memory write access operation, a CPU core 104(1)-104(C) can write data to its private level 2 cache memory L2S. A cache entry evicted from the level 2 cache memory L2S to make room for new write data is communicated over a coherent fabric bus 114 and written to a system cache memory 115 shared among the CPU cores 104(0)-104(C). The CPU 102 also uses the coherent fabric bus 114 to connect to other external peripheral resources 116. Requests from the CPU 102 are communicated over the coherent fabric bus 114 to the destination resource to service such requests. A cache entry evicted from the system cache memory 115 to make room for the new write data in the system cache memory 115 is communicated over the coherent fabric bus 114 to be written to the main memory 108 in the memory system 106.

With continuing reference to FIG. 1, the memory system 106 includes the main memory 108 and a memory controller unit (MCU) system 118 employed to access the main memory 108. The MCU system 118 includes memory control subsystems (MCSs) 120(1)-120(N), wherein 'N' may be four (4) and each MCS 120(1)-120(4) includes interfaces to two (2) memory control circuits 122. The memory control circuits 122 are double-data-rate (DDR) controllers DDR_CTRL in this example. Each DDR controller DDR_CTRL is dedicated to controlling a respective one of the memory modules 110(0)-110(15) to perform a memory access operation. The DDR controllers DDR_CTRL each provide a physical interface (PHY) between the memory control subsystems MCS 120(1)-120(4) and the respective memory module 110(0)-110(15).

FIG. 2 is a block diagram illustrating a memory module 200 corresponding to the memory modules 110(0)-110(15) employed in the CPU 102 in FIG. 1. The memory module 200 includes the plurality of memory chips 112(0)-112(8) (e.g., DRAM memory devices) configured to be coupled to a DDR controller over a memory interface 202. The memory module 200 refers to a substrate or printed circuit board with individual memory chips disposed thereon, such as the memory chips 112(0)-112(8), and a circuit coupled to the memory chips and a memory interface 202. The memory chips 112(0)-112(8) store data written to memory by one of the CPU cores 104(1)-104(C) in FIG. 1 or evicted from the system cache memory 115 in FIG. 1, for example. The memory module 200, including the memory interface 202, may be compliant with a 1DQ Bounded Fault feature described in the JEDEC specification (e.g., DDR5 JEDEC Specification JESD79-4 with a Bounded Fault functionality) and may be employed in the CPU 102 of FIG. 1. The memory interface 202 includes signal wires 204 ("wires") for transferring binary information 208 to or from the memory module 200. A transfer of a binary bit can occur on each of the signal wires 204 in each "beat" of a clock signal CLK. The term "beat" as used herein refers to a transition of the clock signal CLK between two binary states (binary '0' and binary '1'), and a cycle of the clock signal CLK includes two beats. The binary states may be represented as voltage levels, such as a power supply voltage VDD and a reference voltage (e.g., ground voltage) Vss. Command and address information for a memory access operation are provided to the memory module 200 on the command/address bus 209.

A number "W" (e.g., four (4)) of the wires 204 couple to each of the plurality of memory chips 112(0)-112(D), and the wires 204 form a data bus 210 having Wx(D+1) (e.g., 4×(8+1)=thirty-six (36)) of the signal wires 204 through which the binary information 208 is transferred in a memory access operation. Thus, 36 binary bits may be transferred in each beat of the system clock CLK. The memory module 200 may be compliant with the DDR5 DRAM standards found in JESD79-5 promulgated by JEDEC in October 2021. In compliance with the 1DQ Bounded Fault feature in the DDR5 JEDEC standard, the binary information 208 transferred on the data bus 210 in a memory read access operation is limited to one (1) of the wires 204 coupled to one of the memory chips 112(0)-112(D) in the memory interface 202 between the memory module 200 and the memory control circuit 122. The remaining Wx(D+1)−1 wires 204 of the memory interface 202 are assumed to be error-free according to such standards. Thus, the memory control circuits 122 in the DDR controller DDR_CTRL are configured to detect errors in the bits transferred on one (1) wire 204 of the thirty-six (36) wires 204 in the memory interface 202 and also correct the errors. Conventionally, this level of error recovery is performed with ECC symbols alone.

FIG. 3 illustrates an exemplary codeword 300 employed in the memory control circuit 122 for memory access operations over the memory interface 202 to the memory module 200. The following description of the codeword 300 may reference the memory control circuit 122 in FIG. 1 and the memory module 200 in FIG. 2, as well as other features shown only in FIGS. 1 and 2. Each codeword 300 includes a plurality of binary bits of data and error protection information. In particular, each codeword 300 includes a first block 302 and a second block 304, which have equal numbers of bits 306. The first block 302 includes a first data portion 308 and a first supplemental portion 310, and the second block 304 includes a second data portion 312 and a second supplemental portion 314. The second supplemental portion 314 comprises a first ECC symbol 316(0) and a second ECC symbol 316(1) (ECC symbols 316(0)-316(1)), which are used to protect against errors in the second data portion 312. One or more errors in bits 306 of the second data portion 312 received on a single wire 204 of the memory interface 202 are detected and corrected using the ECC symbols 316(0)-316(1). In a conventional codeword, a portion corresponding to the first supplemental portion 310 can include ECC symbols that are used to protect the first block in the manner with which the ECC symbols 316(0)-316(1) protect the second block 304. However, memory utilization may be increased by repurposing some of the bits 306 of the first supplemental portion 310 as metadata bits 318, including codeword information associated with the first data portion 308 and the second data portion 312 in the codeword 300. As an example, the metadata bits 318 may include tag information used for addressing or otherwise identifying data stored in the codeword 300. With some bits 306 of the first supplemental portion 310 repurposed as the metadata bits 318, the number of the bits 306 remaining in the first supplemental portion 310 is not sufficient for ECC symbols 316 providing the same level of protection of the first block 302 as the ECC symbols 316(0)-316(1) of the second supplemental portion 314 provides for the second block 304.

Instead, parity bits 320 are included in the first supplemental portion 310 and are used to check for errors in the first data portion 308. An error on a single wire 204 of the memory interface 202 can be detected as an error in the codeword 300 using the parity bits 320 in the first supplemental portion 310, but parity bits 320 alone cannot identify the wire 204 that provided the erroneous data bit(s) in the first data portion 308, and the error(s) cannot be corrected unless their location is identified. To compensate for the loss of error protection caused by repurposing bits 306 of the first supplemental portion 310 as the metadata bits 318, the second block 304 is merged with the first block 302 to generate a merged second block 322 in binary information 324. The binary information 324 includes two (2) modified codewords 326 in which the second block 304 of the codeword 300 is merged with the first block 302. In some examples, merging the second block 304 of each codeword 300 with the first block 302 of the codeword 300 in a write access operation comprises exclusive-ORing (XORing) the first block 302 with the second block 304. The first block 302 is not modified in this process. The first block 302 and the merged second block 322 are included in a modified codeword 326 that is transferred over the memory interface 202 and stored in the memory module 200 in a write access operation.

FIG. 3 illustrates the binary information 324, including two (2) of the modified codewords 326. The codewords 300 and the modified codewords 326 include rows 328 of bits 306 and columns 330 of bits 306. Each column 330 includes thirty-six (36) bits 306 transferred in a single "beat" (e.g., transition) of the system clock CLK. Each of the rows 328 are bits 306 transferred on the same wire 204 of the memory interface 202. Each modified codeword 326 is transferred in 8 beats, and the entire binary information 324 is transferred to the memory module 200 in sixteen (16) beats of the system clock CLK in a memory access operation.

Subsequently, in response to a memory read operation, the modified codeword 326 is received back into the memory control circuit 122 from the memory module 200. A restored second block 332 is generated from the merged second block 322 and the first block 302 in the modified codeword 326. The restored second block 332 has the form of the second block 304 and is identical to the second block 304 in the absence of any errors that may have been created in the merged second block 322 while being stored in the memory module. Generating the restored second block 332 includes demerging the merged second block 322 using the first block 302. In some examples, demerging the merged second block 322 in a read access operation includes XORing the merged second block 322 of the modified codeword 326 with the first block 302. The first block 302 is not modified by the XORing.

Error detection and correction of the codeword 300 recovered from the modified codeword 326 is more easily understood in view of the respective components of the codeword 300. The first block 302 includes sixteen (16) rows 328 of bits 306 forming the first data portion 308, and two (2) rows 328 for the first supplemental portion 310. The first supplemental portion 310 includes a first row 328 of the metadata bits 318 and a second row 328 of the parity bits 320. The restored second block 332 also includes sixteen (16) rows 328 forming the second data portion 312 and two (2) rows for the second supplemental portion 314. The second supplemental portion 314 includes a first row 328 of ECC bits 333 forming a first restored ECC symbol 334(0) and a second row 328 of ECC bits 333 forming a second restored ECC symbol 334(1). The restored ECC symbols 334(0) and 334(1) are identical to the ECC symbols 316(0) and 316(1) in the absence of errors in the restored ECC symbols 334(0)-334(1). The ECC symbols 316(0)-316(1) were generated from the second data portion 312 to form the second block 304 before the modified codeword 326 was stored in the memory module 200 and are used to detect, locate, and correct errors in the restored second block 332. The first supplemental portion 310 of the first block 302 includes one row 328 of the metadata bits 318 and one row 328 of the parity bits 320. The parity bits 320 are generated from the second data portion 312 and the metadata bits 318 before the modified codeword 326 is written to memory.

Errors may exist in the modified codeword 326 received back from the memory module 200 due to memory circuit problems or transient faults (e.g., due to high energy particles) that occurred while the modified codeword 326 was stored in the memory module 200. The modified codeword 326 may contain errors in one of the rows 328 of the first block 302 or one of the rows 328 of the merged second block 322. Any errors in the first block 302 will create errors in the restored second block 332 during the demerging. If there are no errors in the first block 302, there still may be errors in the restored second block 332 due to errors in the merged second block 322 read back from the memory module 200. Using the restored ECC symbols 334(0)-334(1), the row 328 containing errors in the restored second block 332 is located. As noted above, these errors can also be corrected by the ECC algorithm using the restored ECC symbols 334(0)-334 (1). The ECC (RS) algorithm may be implemented in hardware or based on instructions executed in a processing circuit within the memory control circuit 122.

Using the parity bits 320, the memory control circuit 122 checks the first data block 302 for parity errors. If a parity error is detected, the memory control circuit 122 requests a corrective action be taken. Requesting a corrective action may include sending an error signal indicating a parity error to a processor or supervisory function that handles system errors. The error signal may set a bit in a status register, for example. The processor or supervisory function may re-fetch the codeword 300 or re-execute a command, for example.

In another aspect, if there are errors in the first block 302, it can be determined that the errors found in the restored second block 332 were caused by the errors in the first block 302 because there can only be errors in one of the rows 328. Therefore, it can be determined that parity errors found in a row 328 of the first block 302 correspond to a row 328 in which the errors were found in the restored second block 332. Thus, in this aspect, the request for corrective action may cause the memory control circuit 122 to locate and correct the parity errors in the first block 302.

If there are no parity errors found in the first block 302, it can be determined that the errors originated in the merged second block 322. In this case, the errors in the merged second block 322 can be corrected, and there are no corresponding errors in the first block 302. Therefore, whether a row 328, including errors, is determined to be in the first block 302 or the restored second block 332, the errors can be located and corrected. With the parity bits 320 in the first supplemental portion 310 and the process of merging the first block 302 with the restored second block 332, which is protected by the ECC symbols 316(0)-316(1), the exemplary memory control circuit 122 can increase memory utilization while maintaining a high level of error protection using the codeword 300.

Figure 4:
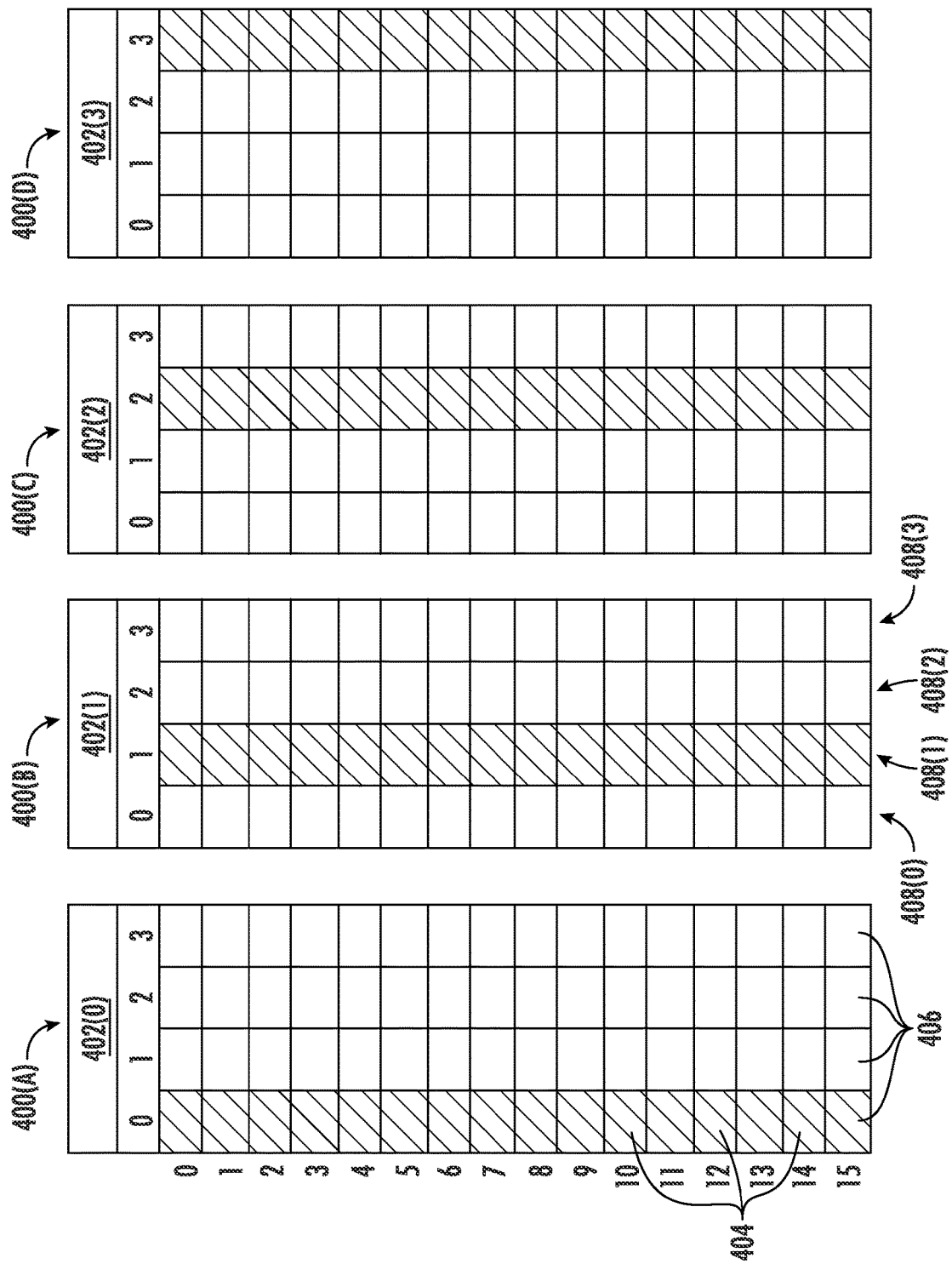
FIG. 4 is a diagram illustrating patterns of recoverable bit errors in the binary information transferred from memory chips to a memory control circuit that merges ECC protected blocks with parity protected blocks in each codeword to increase memory utilization and maintain a previous level of error protection.

FIG. 4 includes diagrams 400(A)-400(D) illustrating patterns 402(0)-402(3) of bit errors 404 in bits 406 received from the memory module 200 in FIG. 2. The patterns 402(0)-402(3) include columns 408(0)-408(3) each including sixteen (16) bits 406. The columns 408(0)-408(3) correspond to the rows 328 in the binary information 324 shown in FIG. 3 that are received from one (e.g., 112(0)) of the memory chips 112(0)-112(8) in FIG. 1. The binary information 324 includes thirty-six (36) rows 328, so the patterns 402(0)-402(3) each illustrate examples of recoverable bit errors 404 assuming that none of the remaining thirty-two (32) rows 328 received from any of the other memory chips (e.g., 112(1)-112(8)) include any bit errors 404, according to the JEDEC 1DQ Bounded Fault feature. In each of the patterns 402(0)-402(3), only one of the columns 408(0)-408 (3) includes errors. The pattern 402(0) includes bit errors 404 in all (16) of the bits 406 in column 408(0). Pattern 402(1) includes bit errors 404 in column 408(1), and patterns 402(2) and 402(3) have errors in columns 408(2) and 408(3), respectively. Although the patterns 402(0)-402(3) each include sixteen (16) bit errors 404, any number from one (1) to sixteen (16) bit errors 404 occurring in a single one of the columns 408(0)-408(3) can be corrected by the memory control circuit 122 using ECC or a combination of ECC and parity in the codeword 300 in FIG. 3.

Figure 5:
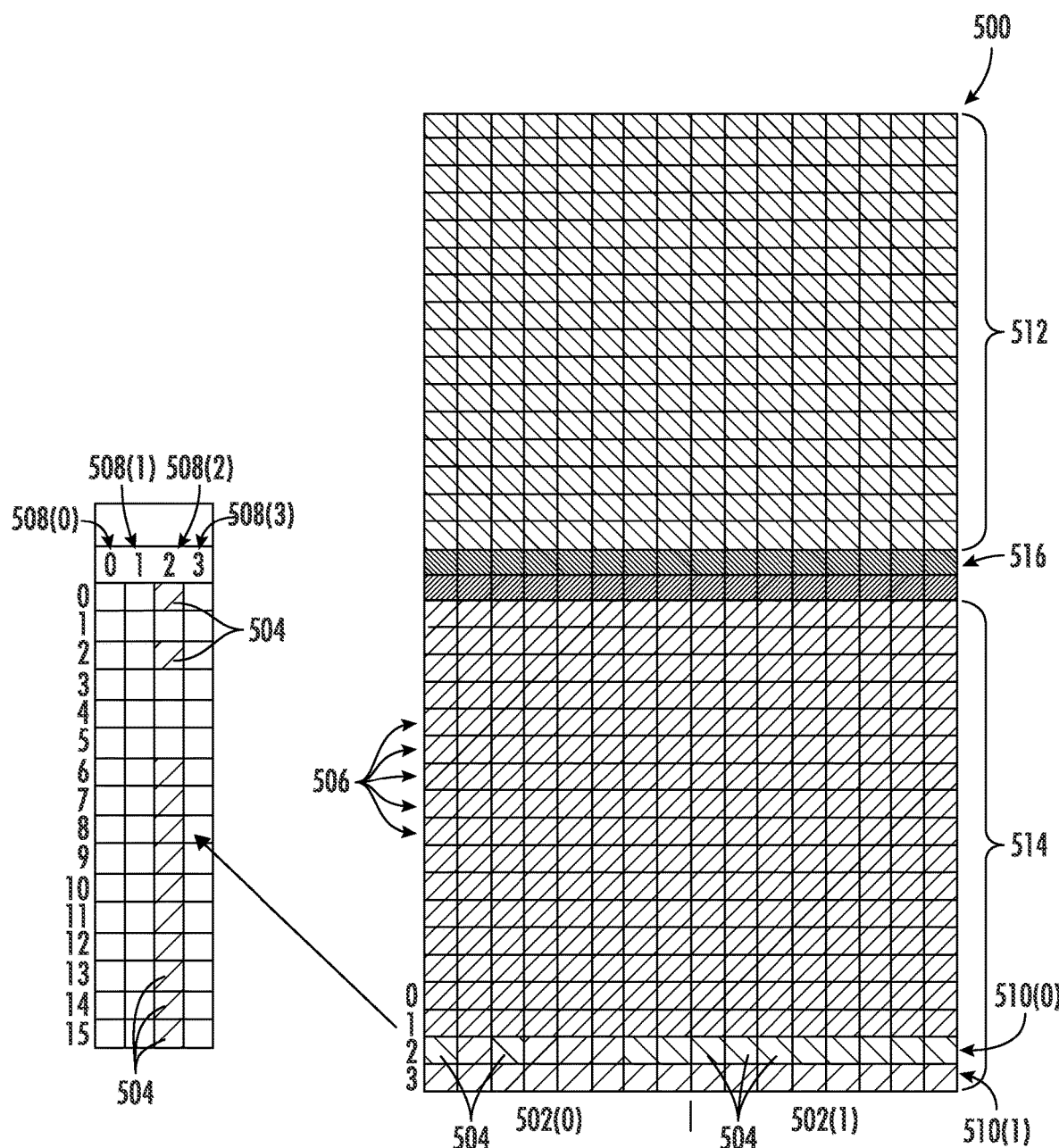
FIG. 5 is a diagram illustrating an error pattern in the binary information received in response to a memory read operation and from which the original data may be recovered using the exemplary memory control circuit integrating ECC with parity protection in each codeword to increase memory utilization.

FIG. 5 illustrates a binary information 500, including codewords 502(0)-502(1), which correspond to the codewords 300 read back from a memory module 200, including the restored second block 332 as described with reference to FIG. 3. The codewords 502(0)-502(1) have bit errors 504 in one of a plurality of rows 506. The plurality of rows 506 corresponds to bits received on signal wires from the memory chip 112(8) (see FIG. 2). The plurality of rows 506 are shown separately as columns 508(0)-508(3) corresponding to the columns 408(0)-408(3) in the diagrams 400(A)-400(D) in FIG. 4. The bit errors 504 are present in column 508(2) of the columns 508(0)-508(3). The bit errors 504 are received at beats 0, 2, and 6-15 of a memory access operation. Based on the format of the codeword 300 in FIG. 3, column 508(2) contains a first ECC symbol 510(0) of a first codeword 502(0) received in beats 0-7 and a first ECC symbol 510(1) of a second codeword 502(1) received in beats 8-15 of the transfer of the binary information 500. Since the bit errors 504 are in the first ECC symbols 510(0), there are no bit errors 504 in a first data portion 512 or a second data portion 514 or the metadata bits 516 in either of the codewords 502(0)-502(1). However, since none of the other rows 506 of the binary information 500 contain any bit errors 504, the bit errors 504 in the first ECC symbols 510(0) in each of the codewords 502(0)-502(1) can be recovered using an ECC algorithm.

Figure 6:
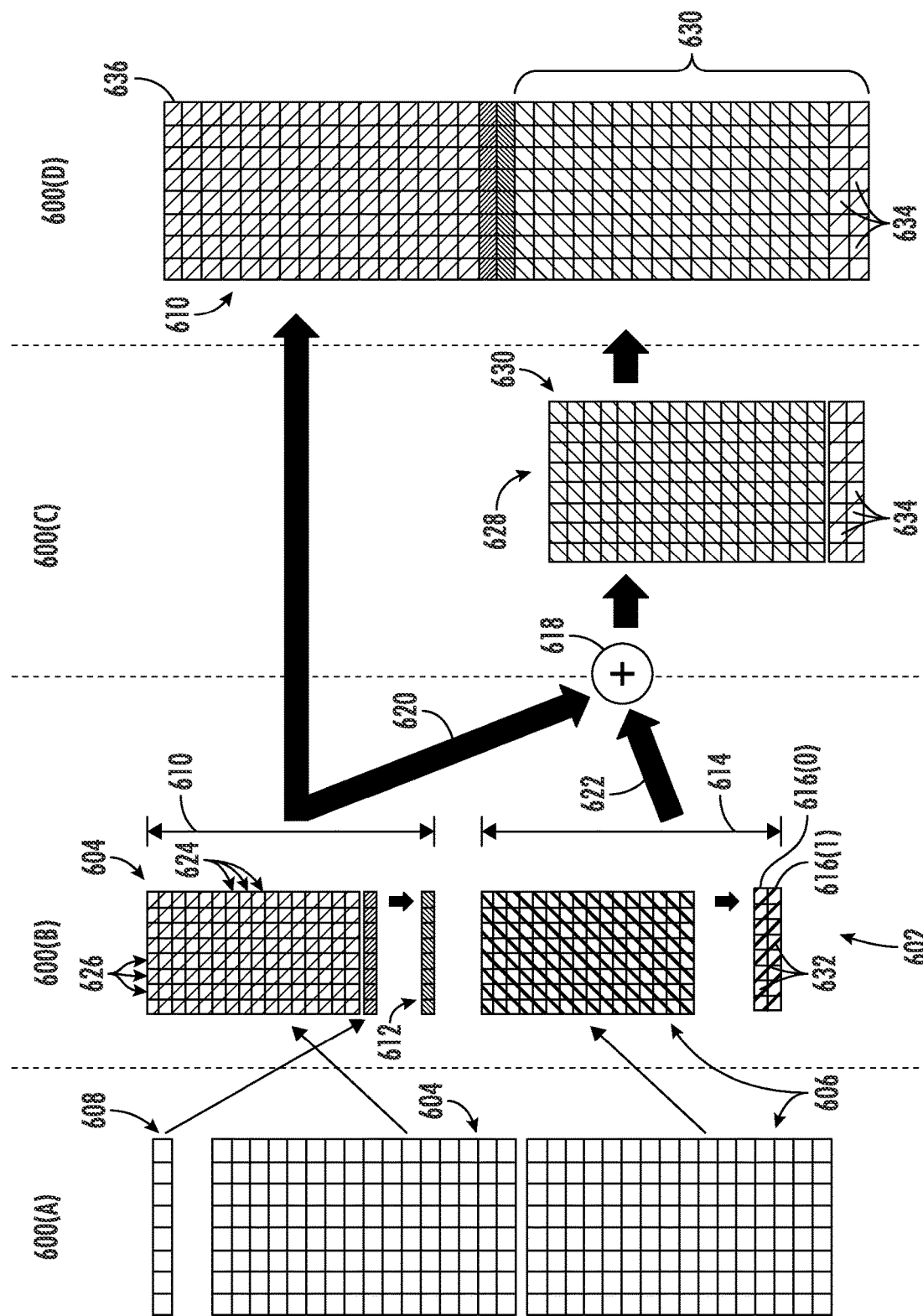
FIG. 6 is a diagram illustrating stages of encoding data to integrate ECC protection and parity protection in a codeword for storage to a memory module in a memory write operation.

FIG. 6 is a diagram illustrating a sequence of stages 600(A)-600(D) of a method of generating a codeword 602 by a memory control circuit. Instances of "memory control circuit" in this description are a reference to the memory control circuits 122, which are shown in FIG. 1 and not shown in FIG. 6. The codeword 602 includes a first data portion 604, a second data portion 606, and metadata bits 608 received in the memory control circuit in stage 600(A) in conjunction with a memory write instruction. Stage 600(B) shows a first block 610, including the first data portion 604, the metadata bits 608, and parity bits 612. The parity bits 612 are generated based on the first data portion 604 and the metadata bits 608. Generation of the parity bits 612 may include XORing the first data portion 604 and the metadata bits 608. Stage 600(B) also shows a second block 614, including the second data portion 606, a first ECC symbol 616(0), and a second ECC symbol 616(1), which are generated based on the second data portion 606. An ECC algorithm (e.g., RS algorithm) is employed to generate the first ECC symbol 616(0) and the second ECC symbol 616(1) from the first data portion 604. The first block 610 and the second block 614 may correspond to the first block 302 and the second block 304, respectively, in FIG. 3.

Stage 600(C) illustrates merging the first block 610 with the second block 614. In this example, the merging includes an XOR operator 618 in which the first block 610 is XORed with the second block 614. The XOR operator 618 represents hardware in the form of logic circuits configured to perform an XOR operation or a processing circuit configured to execute instructions that perform an XOR operation. The first block 610 includes a first plurality of bits 620 and the second block 614 includes a second plurality of bits 622. In this regard, the merging includes, for each bit 620 of the first plurality of bits 620, XORing the bit 620 with a corresponding bit 622 (e.g., of a corresponding row 624 and column 626) of the second plurality of bits 622 to generate a corresponding bit 618 of a third plurality of bits 628. The third plurality of bits 628 are the bits 628 of a merged second block 630, which may correspond to the merged second block 322 discussed with reference to FIG. 3.

In further detail, the first data portion 604 includes a number N of rows 624 of bits 620, and the second data portion 606 includes the number N of rows 624 of bits 622. In this example, N=sixteen (16). The second block 614 also includes a first row 624 of ECC bits 632 for the first ECC symbol 616(0) and a second row 624 of ECC bits 632 for the second ECC symbol 616(1). The first block 610 further includes a row 624 for the metadata bits 608 and a row 624 for the parity bits 612. In this regard, the memory control circuit merging the first block 610 with the second block 614 is configured to, for each of the N rows 624 of the first block 610, XOR the bits 620 of the row 624 of the first block 610 with bits 622 of a corresponding row 624 of the N rows 624 of the second block 614 to generate bits 628 of a row 624 of N rows 624 of third data bits 628 of the merged second block 630. The memory control circuit is also configured to XOR the first row 624 of the ECC bits 632 with the row 624 of metadata bits 608 to generate a first row 624 of merged ECC bits 634, and XOR the second row 624 of the ECC bits 632 with the row 624 of parity bits 612 to generate a second row 624 of merged ECC bits 634. The merged second block 630 is produced from the XOR operation, as shown in stage 600(C). Stage 600(D) is an illustration of a modified codeword 636, including the first block 610 of the codeword 602 and the merged second block 630. The modified codeword 636 shown in stage 600(D) is transferred to a memory module in a memory write operation.

Figure 7:
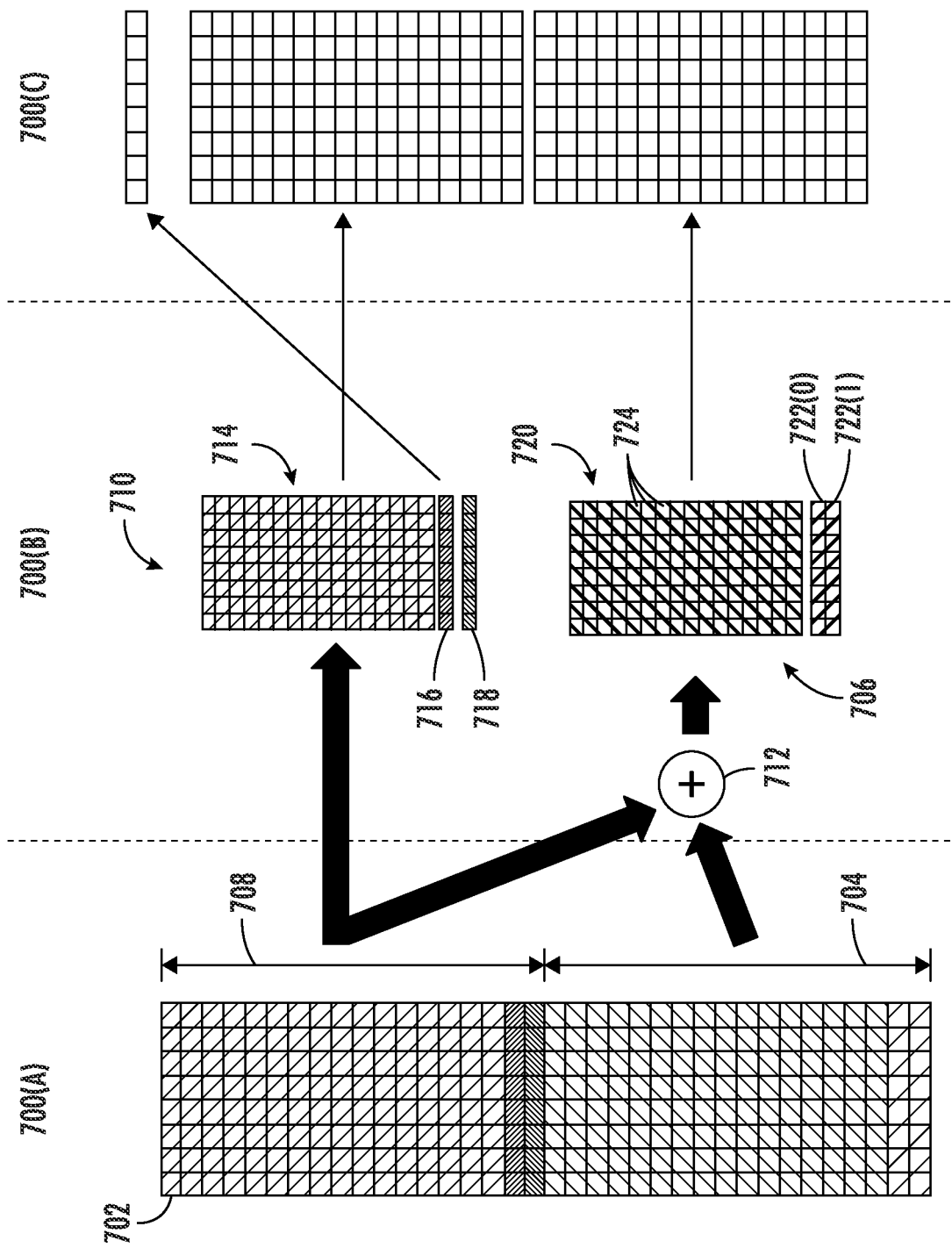
FIG. 7 is a diagram illustrating stages of decoding an encoded codeword received in a memory control circuit from a memory module in a memory read operation and recovering from errors in the codeword using ECC and parity.

FIG. 7 includes diagrams illustrating a sequence of stages 700(A)-700(C) of a method in a memory control circuit for demerging a modified codeword 702. The modified codeword 702 has the format of the modified codeword 636 of FIG. 6. In the absence of errors created while the modified codeword 636 is stored in the memory module 200 of FIG. 2, the modified codeword 702 is identical to the modified codeword 636. The memory control circuit configured to generate the modified codeword 636, as described above regarding FIG. 6, is also configured to demerge a merged second block 704 of the modified codeword 702 to generate a restored second block 706, as shown in FIG. 7. The restored second block 706 corresponds to the second block 614 in FIG. 6.

The memory control circuit is configured to receive a modified codeword 702 from a memory module at stage 700(A). The modified codeword 702 is received over a memory interface 202 in a memory read operation as one of two modified codewords 702 transferred in a memory read operation. The modified codeword 702 includes a first block 708 and the merged second block 704. As shown in stage 700(B), the first block 708 is passed unchanged to be the first block 708 of a codeword 710. Also, in stage 700(B), an XOR operator 712 receives the first block 708 and the merged second block 704 and XORs the first block 708 with the merged second block 704 to generate the restored second block 706. The codeword 710 includes the first block 708 and the restored second block 706. In the absence of errors, the codeword 710 is identical to the codeword 602 in FIG. 6. The first block 708 includes a first data portion 714, metadata bits 716, and parity bits 718, corresponding to the first data portion 604, the metadata bits 608, and the parity bits 612 in FIG. 6. The restored second block 706 includes a second data portion 720, a first ECC symbol 722(0), and a second ECC symbol 722(1) corresponding, respectively, to the second data portion 606, and the first and second ECC symbols 616(0)-616(1) in FIG. 6.

As previously described, an ECC algorithm is employed to use the ECC symbols 722(0)-722(1) to detect, locate, and correct errors that may exist in one of the rows 724 of the second data portion 720 in the restored second block 706. Parity is generated based on the first data portion 714, and the metadata bits 716. The generated parity is compared to the parity bits 718 to detect parity errors in the first block 708. A parity error detected using the parity bits 718 can be located and corrected based on the location of errors found in the restored second block 706. Stage 700(C) illustrates the first data portion 714, the metadata bits 716, and the second data portion 720, with errors corrected, to be returned in response to a memory read instruction (e.g., from a processor).

Figure 8:
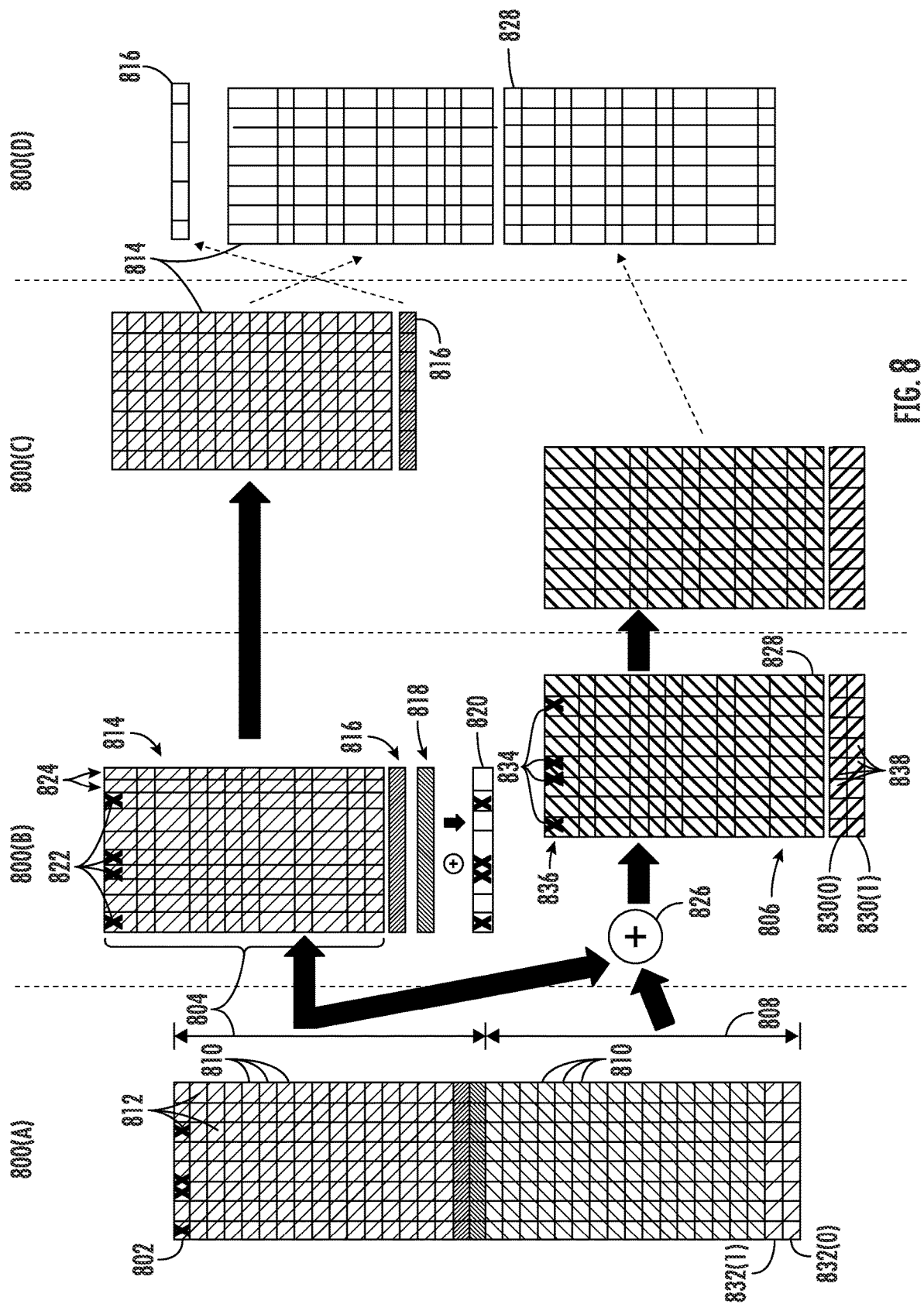
FIG. 8 is a diagram illustrating stages of decoding an encoded codeword, including errors received in a memory control circuit from a memory module and recovering from the errors using ECC and parity.

FIG. 8 illustrates stages 800(A)-800(D) of demerging a modified codeword 802 corresponding to the modified codeword 702 in FIG. 7; however, FIG. 8 illustrates an example in which the modified codeword 802 includes errors in a first block 804 that are reflected in a restored second block 806 due to the demerging. In this manner, the errors in the first block 804, which are detected as parity errors, can be corrected.

The memory control circuit is configured to receive the modified codeword 802, including the first block 804 and the merged second block 808 having a same number of rows 810 of bits 812, as shown in stage 800(A). The modified codeword 802 is received with another modified codeword 802 in a memory read operation from a memory module. The first block 804 is passed unchanged from stage 800(A) to stage 800(B), where parity checking is performed. The first block 804 includes a first data portion 814, metadata bits 816, and parity bits 818. Parity is generated from the first data portion 814 and the metadata bits 816 and compared to the parity bits 818. A parity error indication 820 is generated, indicating that there are parity errors 822 in four (4) columns 824 of the first data portion 814. The parity is determined on the basis of bits 812 in the columns 824. It can be seen in FIG. 8 that the parity errors 822 are in the first row 810 of the first data portion 814; however, parity checking cannot determine which of the rows 810 contains the parity errors 822.

The memory control circuit includes an XOR operator 826 configured to demerge the merged second block 808 with the first block 804 to generate a restored second block 806. Demerging the merged second block 808 includes, in some examples, XORing the first block 804 with the merged second block 808 to generate the restored second block 806. The first block 804 comprises a first plurality of the bits 812. The merged second block 808 comprises a second plurality of the bits 812, and the restored second block 806 comprises a third plurality of the bits 812. In this aspect, demerging the merged second block 808 based on the first block 804 comprises, for each bit 812 of the first plurality of bits 812, XORing the bit 812 of the first plurality of bits 812 (of the first block 804) with a corresponding bit 812 (e.g., same row 810 and column 824) of the second plurality of bits 812 (of the merged second block 808) to generate a corresponding bit 812 of the third plurality of bits 812 (of the restored second block 806).

In stage 800(C), an ECC algorithm is employed to detect, locate, and correct bit errors 834 in the second data portion 828 based on the restored ECC symbols 830(0)-830(1), which are generated by demerging ECC symbols 832(0)-832(1). The parity errors 822 in the first row 810 of the first data portion 814 cause bit errors 834 in the corresponding bits 812 of the first row 810 of the second data portion 828 when the first block 804 is XORed with the merged second block 808 to generate the restored second block 806. The ECC algorithm identifies the first row 810 as the location of the bit errors 834 in the second data portion 828. The location of the bit errors 834 in the second data portion 828 is used to identify the row 810 of the parity errors 822 in the first data portion 814, which makes it possible for the parity errors 822 to also be corrected.

In some examples, determining the first block 804 comprises the bit errors 834 comprises determining whether the restored second block 806 comprises the bit errors 834. The memory control circuit is also configured to, in response to determining the restored second block 806 comprises the bit errors 834, identify a location 836 (e.g., row 810) of the bit errors 834 in the restored second block 806 and correct the bit errors 834. The memory control circuit is also configured to, in response to determining the first block 804 comprises the parity errors 822, correct the parity errors 822 based on the location 836 of the bit errors 834 in the restored second block 806.

Here, the memory control circuit is configured to determine whether the first block 804 comprises the parity errors 822 in response to determining the restored second block 806 comprises the bit errors 834. Parity errors 822 in the first block 804 create bit errors 834 in the restored second block 806 due to XORing the first block 804 and the merged second block 808. However, the reverse is not true. Thus, if no bit error 834 is found in the restored second block 806, there should be no parity errors 822 in the first block 804, so there may be no reason to check for parity errors 822 in the first block 804. A parity error 822 check could be performed in parallel with the ECC algorithm and independent of the determination of whether there is a bit error 834 in the restored second block 806.

In another example, the first block 804 comprises a first plurality of the rows 810 that each comprise a first number N (e.g., 16) of the data bits 812. The first block 804 also includes a first row 810 of ECC bits 838 comprising the first ECC symbol 830(0) and a second row 810 of the ECC bits 838 comprising the second ECC symbol 830(1). The merged second block 808 includes a second number N (e.g., 16) of the rows 810 of the data bits 812, a row 810 comprising the metadata bits 816, and a row 810 comprising the parity bits 818. In this example, demerging the merged second block 808 from the first block 804 includes the memory control circuit being configured to, for each of the first N rows 810 of the bits 812 of the first block 804, XOR the row 810 of the bits 812 with a corresponding row 810 of the second N row 810 of the bits 812 of the merged second block 808 to generate a row 810 of a third N row 810 of bits 812 of the restored second block 806. The memory control circuit is also configured to XOR the first row 810 of the ECC bits 838 with the row 810 comprising the metadata bits 816 to generate a row 810 comprising a restored first ECC symbol 830(0), and XOR the second row 810 of the ECC bits 838 with the row 810 comprising the parity bits 818 to generate a row 810 comprising a restored second ECC symbol 830(1). In this example, identifying the location 836 of the bit errors 834 in the restored second block 806 comprises determining which row 810 of the second plurality of rows 810 comprises the bit error 834 and correcting the bit error 834 in the restored second block 806 comprises regenerating at least one bit 812 in the row 810 comprising the bit errors 834 based on the restored first ECC symbol 830(0) and the restored second ECC symbol 830(1). In a further example, correcting the parity error 822 in the first block 804 comprises identifying a row 810 in the first block 804 corresponding to the row 810 of the restored second block 806 comprising the bit errors 834, and correcting one or more bits 812 in the identified row 810 of the first block 804.

Referring back to FIGS. 1 and 2, the memory control circuits 122 include a physical interface PHY configured to couple to a memory interface, such as the memory interface 202, including a plurality of signal wires 204 to receive the modified codeword 802. Each signal wire 204 of a first N+2 (i.e., 18, where N=16) of the signal wires 204 receives the bits 812 of a corresponding one of the first plurality of rows 810 (of the first block 804), and each signal wire 204 of a second N+2 of the signal wires 204 receives the bits 812 of a corresponding one of the second plurality of rows 810 (of the merged second block 808). The memory interface 202 is configured to receive the modified codeword 802 comprising one or more of the bit errors 834 on one of the plurality of signal wires 204. In this regard, the memory control circuit receives, in four (4) cycles of a clock signal CLK, eight (8) bits 812 comprising a row 810 of the first plurality of rows 810 on each signal wire 204 of the first N+2 signal wires of the plurality of signal wires 204, and eight (8) bits 812 comprising a row 810 of the second plurality of rows 810 on each signal wire 204 of the second N+2 signal wires of the plurality of signal wires 204. In some examples, the memory interface comprises thirty-six (36) of the signal wires 204, and the memory control circuit is configured to receive a modified codeword 802 comprising two-hundred eighty-eight (288) bits 812.

In stage 800(D), the first data portion 814, the second data portion 828, and the metadata bits 816 are returned to complete the memory read operation.

Figure 9:
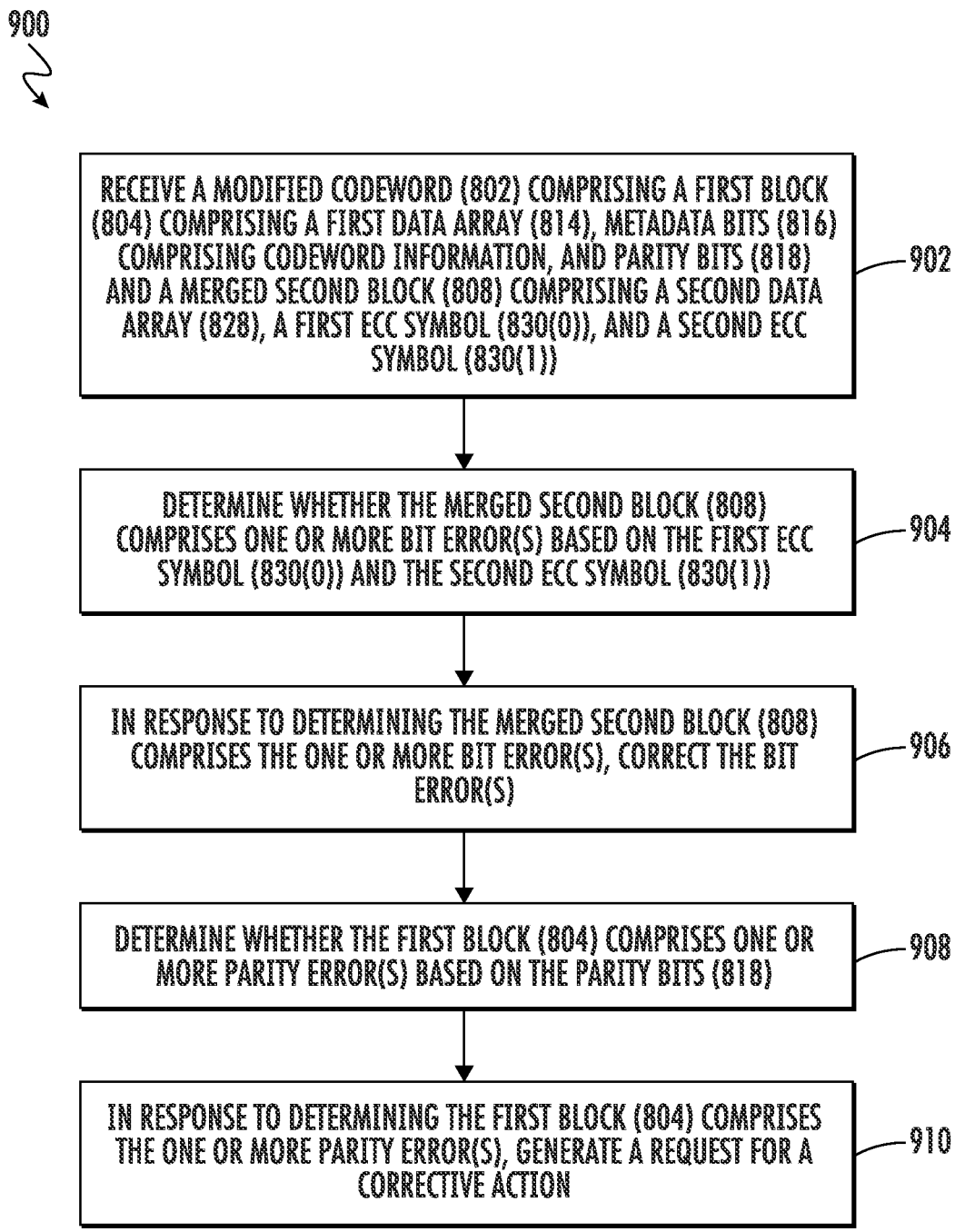
FIG. 9 is a flowchart illustrating a process of decoding a codeword and recovering from errors using the integrated ECC and parity disclosed herein.

FIG. 9 is a flowchart illustrating an exemplary method 900 of codeword processing in a memory access operation comprising receiving a modified codeword 802 comprising a first block 804 comprising a first data portion 814, metadata bits 816 comprising codeword information, and parity bits 818, and a merged second block 808 comprising a second data portion 828, a first ECC symbol 830(0), and a second ECC symbol 830(1) (block 902). The method includes determining whether the merged second block 808 comprises one or more bit error(s) based on the first ECC symbol 830(0) and the second ECC symbol 830(1) (block 904). The method further includes, in response to determining the merged second block 808 comprises the one or more bit error(s), correcting the bit error(s) (block 906). The method further comprises determining whether the first block 804 comprises one or more parity error(s) based on the parity bits 818 (block 908). The method also comprises, in response to determining the first block 804 comprises the one or more parity error(s), generate a parity error indication 820 (block 910).

Figure 10:
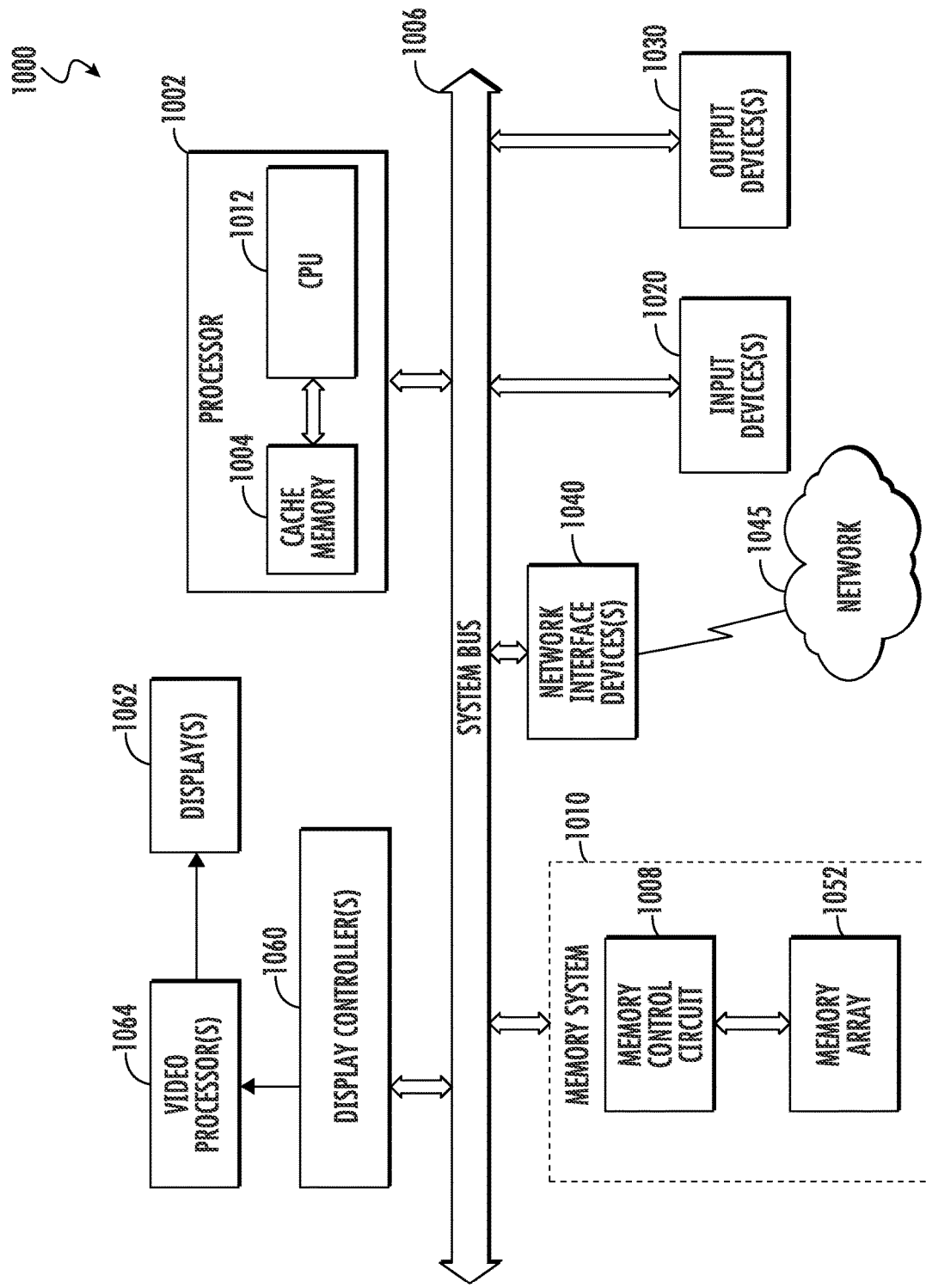
FIG. 10 is a block diagram of an exemplary computer system, including a central processing unit (CPU) that includes a plurality of CPU cores and peripheral devices and other resources, including a memory system in which ECC and parity are integrated in a memory control circuit to provide increased memory utilization.

In this regard, FIG. 10 illustrates an example of a processor-based system 1000 that increases memory utilization while maintaining error recovery protection of codewords accessed from memory. In this example, the processor-based system 1000 includes a processor 1002, including a cache 1004. The processor 1002 is coupled to a system bus 1006 and can communicate with other devices by exchanging address, control, and data information over the system bus 1006. For example, the processor 1002 can communicate bus transaction requests to a memory control circuit 1008 in a memory system 1010. The processor 1002 includes a CPU 1012 corresponding to the CPU 102 in FIG. 1, and the memory control circuit 1008 may be the memory control circuit 112 described with reference to FIGS. 1-8, which configures codewords to increase memory utilization by including metadata bits. The memory control circuit 1008 maintains error recovery protection by merging a first block of bits protected by parity with a second block of bits protected by ECC before the codeword is stored in memory. Although not illustrated in FIG. 10, multiple system buses 1006 could be provided, wherein each system bus 1006 constitutes a different fabric.

Other devices can be connected to the system bus 1006. As illustrated in FIG. 10, these devices can include one or more input devices 1020, one or more output devices 1030, one or more network interface devices 1040, and one or more display controllers 1060, as examples. The input device(s) 1020 can include any type of input device, including, but not limited to, input keys, switches, voice processors, etc. The output device(s) 1030 can include any type of output device, including, but not limited to, audio, video, other visual indicators, etc. The network interface device(s) 1040 can be any device configured to allow an exchange of data to and from a network 1045. The network 1045 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1040 can be configured to support any type of communications protocol desired. The memory system 1010 can include the memory control circuit 1008 coupled to one or more memory array(s) 1052.

The processor 1002 may also be configured to access the display controller(s) 1060 over the system bus 1006 to control information sent to one or more displays 1062. The display controller(s) 1060 sends information to the display(s) 1064 to be displayed via one or more video processors 1064, which process the information to be displayed into a format suitable for the display(s) 1062. The display(s) 1062 can include any type of display, including, but not limited to, a cathode ray tube (CRT), a liquid crystal display (LCD), a plasma display, a light-emitting diode (LED) display, etc.

According to aspects disclosed herein, the exemplary memory control circuit 1008 may be provided in or integrated into any processor-based device. Examples, without limitation, include a server, a computer, a portable computer, a desktop computer, a mobile computing device, a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic devices, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein and is to be accorded the widest scope consistent with the principles and novel features disclosed herein.

What is claimed is:

1. A memory control circuit configured to:
   receive a codeword comprising:
   a first block comprising:
   a first data portion;
   metadata bits comprising codeword information; and
   parity bits; and
   a second block comprising:
   a second data portion;
   a first error correction code (ECC) symbol; and
   a second ECC symbol,
   wherein the first block and the second block comprise a same number of bits;
   determine whether the second block comprises one or more bit error(s) based on the first ECC symbol and the second ECC symbol; and
   in response to determining the second block comprises the one or more bit error(s), correct the bit error(s);
   determine whether the first block comprises one or more parity error(s) based on the parity bits; and
   in response to determining the first block comprises the one or more parity error(s), generate a request for a corrective action.

2. The memory control circuit of claim 1, wherein:
   the codeword comprises a modified codeword;
   the second block comprises a merged second block; and
   the memory control circuit is further configured to demerge the merged second block based on the first block to generate a restored second block, wherein the memory control circuit configured to determine whether the second block comprises the one or more bit error(s) further comprises the memory control circuit being configured to determine whether the restored second block comprises the one or more bit error(s).

3. The memory control circuit of claim 2, further configured to:
   in response to determining the restored second block comprises the one or more bit error(s):
   identify a location of the one or more bit error(s) in the restored second block; and
   correct the one or more bit error(s);
   determine whether the first block comprises the one or more parity error(s) in response to determining the restored second block comprises the one or more bit error(s); and
   in response to the request for a corrective action, correct the one or more parity error(s) in the first block based on the location of the one or more bit error(s) in the restored second block.

4. The memory control circuit of claim 3, wherein:
   the first block comprises a first plurality of rows comprising:
   a first number (N) of rows of bits of the first data portion;
   a first row comprising the metadata bits; and
   a first row comprising the parity bits; and
   the second block comprises a second plurality of rows comprising:
   a second N rows of bits of the second data portion;
   a first row of ECC bits comprising the first ECC symbol; and
   a second row of ECC bits comprising the second ECC symbol;
   wherein:
   the memory control circuit configured to demerge the merged second block based on the first block comprises the memory control circuit further configured to:
   for each of the first N rows of bits of the first block, XOR the row of bits of the first block with a corresponding row of the second N rows of bits of the merged second block to generate a row of bits of the restored second block;
   XOR the first row of ECC bits with the first row of the first block comprising the metadata bits to generate a row comprising a restored first ECC symbol; and
   XOR the second row of ECC bits with the second row of the first block comprising the parity bits to generate a row comprising a restored second ECC symbol.

5. The memory control circuit of claim 4, wherein:
   the memory control circuit configured to identify a location of the one or more bit error in the restored second block comprises the memory control circuit being further configured to determine which row of the restored second block comprises the one or more bit error; and
   the memory control circuit configured to correct the one or more bit error in the restored second block comprises the memory control circuit being further configured to regenerate at least one bit in the row of the restored second block comprising the one or more bit error based on the restored first ECC symbol and the restored second ECC symbol.

6. The memory control circuit of claim 5, wherein the memory control circuit configured to correct the one or more parity error(s) in the first block, comprises the memory control circuit further configured to:

identify a row in the first block corresponding to the row of the restored second block comprising the one or more bit error(s); and correct the one or more parity error(s) in the identified row of the first block based on the parity bits.

7. The memory control circuit of claim 4, wherein the memory control circuit is further configured to couple to a memory interface comprising a plurality of signal wires configured to receive the modified codeword, wherein:

each signal wire of a first N+2 signal wires of the plurality of signal wires receives the bits of a corresponding one of the first plurality of rows;

each signal wire of a second N+2 signal wires of the plurality of signal wires receives the bits of a corresponding one of the second plurality of rows; and the memory interface is configured to receive the codeword comprising one or more of the bit errors on one of the plurality of signal wires.

8. The memory control circuit of claim 7, further configured to receive, in four (4) cycles of a clock signal:

eight (8) bits on each signal wire of the first N+2 signal wires of the plurality of signal wires; and eight (8) bits on each signal wire of the second N+2 signal wires of the plurality of signal wires.

9. The memory control circuit of claim 2, wherein the memory control circuit configured to demerge the merged second block based on the first block comprises the memory control circuit being further configured to exclusive-OR (XOR) the first block with the merged second block to generate the restored second block.

10. The memory control circuit of claim 2, wherein:

the first block comprises a first plurality of bits;

the merged second block comprises a second plurality of bits;

the restored second block comprises a third plurality of bits; and the memory control circuit configured to demerge the merged second block based on the first block comprises the memory control circuit further configured to, for each bit of the first plurality of bits, XOR the bit of the first plurality of bits with a corresponding bit of the second plurality of bits to generate a corresponding bit of the third plurality of bits.

11. The memory control circuit of claim 1, integrated into an integrated circuit (IC).

12. The memory control circuit of claim 1, further integrated into a device selected from the group consisting of: a server, a computer, a portable computer, a desktop computer, a mobile computing device, a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

13. The memory control circuit of claim 1, wherein the request for a corrective action comprises providing an error signal to a processor or supervisory function.

14. A method of codeword processing in a memory access operation, the method comprising:

receiving a codeword comprising:
 a first block comprising:
  a first portion of data bits;
  metadata bits comprising codeword information; and
  parity bits;
 a second block comprising:
  a second portion of data bits;
  a first ECC symbol; and
  a second ECC symbol,
 wherein the first block and the second block comprise a same number of bits, determining whether the second block comprises one or more bit error(s) based on the first ECC symbol and the second ECC symbol;

in response to determining the second block comprises the one or more bit error, correcting the one or more bit error;

determining whether the first block comprises one or more parity error(s) based on the parity bits; and in response to determining the first block comprises the one or more parity errors, generating a request for a corrective action.

15. The method of claim 14, wherein:

second block comprises a merged second block;

the method further comprises demerging the merged second block based on the first block to generate a restored second block; and determining whether the second block comprises the one or more bit error further comprises determining whether the restored second block comprises the one or more bit error.

16. The method of claim 15, further comprising:

in response to determining the restored second block comprises the one or more bit error:
 identifying a location of the one or more bit error in the restored second block; and
 correcting the one or more bit error;

determining whether the first block comprises the one or more parity error in response to determining the restored second block comprises the one or more bit error; and in response to the request for a corrective action, correcting the one or more parity error in the first block based on the location of the one or more bit error in the restored second block.

17. The method of claim 16, wherein:

the first block comprises a first plurality of rows comprising:
 a first number (N) of rows of bits of the first data portion;
 a first row comprising the metadata bits; and
 a first row comprising the parity bits; and the second block comprises a second plurality of rows comprising:
 a second N rows of bits of the second data portion;
 a first row of ECC bits comprising the first ECC symbol; and
 a second row of ECC bits comprising the second ECC symbol; and demerging the merged second block based on the first block comprises:
 for each of the first N rows of bits of the first block, XORing the row of bits of the first block with a corresponding row of the second N rows of bits of the merged second block to generate a row of bits of the restored second block;

XORing the first row of ECC bits with the first row of the first block comprising the metadata bits to generate a row comprising a restored first ECC symbol; and XORing the second row of ECC bits with the second row of the first block comprising the parity bits to generate a row comprising a restored second ECC symbol.

18. The method of claim 17, wherein:

identifying a location of the one or more bit error in the restored second block comprises determining which row of the restored second block comprises the one or more bit error; and correcting the one or more bit error in the restored second block comprises regenerating at least one bit in the row of the restored second block comprising the one or more bit error based on the restored first ECC symbol and the restored second ECC symbol.

19. The method of claim 18, wherein correcting the one or more parity error in the first block comprises:

identifying a row in the first block corresponding to the row of the restored second block comprising the one or more bit error; and correcting the one or more parity error(s) in the identified row of the first block based on the parity bits.

20. The method of claim 17, further comprising receiving the codeword as a modified codeword on a plurality of signal wires, comprising:

receiving the bits of one of the first plurality of rows on each signal wire of a first N+2 signal wires of the plurality of signal wires;

receiving the bits of one of the second plurality of rows on each signal wire of a second N+2 signal wires of the plurality of signal wires; and receiving the one or more bit errors on one of the plurality of signal wires.

21. The method of claim 20, further comprising receiving, in four (4) cycles of a clock signal:

eight (8) bits on each signal wire of the first N+2 signal wires of the plurality of signal wires; and eight (8) bits on each signal wire of the second N+2 signal wires of the plurality of signal wires.

22. The method of claim 15, wherein demerging the merged second block based on the first block comprises exclusive-ORing (XORing) the first block with the merged second block to generate the restored second block.

23. The method of claim 15, wherein:

the first block comprises a first plurality of bits;

the merged second block comprises a second plurality of bits;

the restored second block comprises a third plurality of bits; and demerging the merged second block based on the first block comprises, for each bit of the first plurality of bits, XORing the bit of the first plurality of bits with a corresponding bit of the second plurality of bits to generate a corresponding bit of the third plurality of bits.

24. The method of claim 14, wherein generating a request for a corrective action comprises providing an error signal to a processor or supervisory function.

* * * * *